(12) United States Patent
Wiegand et al.

(10) Patent No.: US 10,462,287 B2
(45) Date of Patent: *Oct. 29, 2019

(54) AUTOMATIC CALLER IDENTIFICATION TRANSLATION

(71) Applicant: Fraunhofer-Gesellschaft zur Foerderung der angewandten Forschung e.V., Munich (DE)

(72) Inventors: Thomas Wiegand, Berlin (DE); Thomas Haustein, Potsdam (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,499

(22) Filed: May 31, 2018

(65) Prior Publication Data

US 2018/0278743 A1 Sep. 27, 2018

Related U.S. Application Data

(60) Division of application No. 15/467,736, filed on Mar. 23, 2017, now Pat. No. 10,009,459, which is a
(Continued)

(30) Foreign Application Priority Data

Sep. 25, 2014 (EP) .................................... 14186402

(51) Int. Cl.
*H04M 1/56* (2006.01)
*H04M 15/06* (2006.01)
(Continued)

(52) U.S. Cl.
CPC . *H04M 3/42042* (2013.01); *H04M 1/274516* (2013.01); *H04M 3/42068* (2013.01);
(Continued)

(58) Field of Classification Search
CPC ...... H04M 3/4365; H04M 1/57; H04M 1/663; H04M 1/665; H04M 2203/2005; H04M 3/436; H04M 3/53308; A01B 12/006
(Continued)

(56) References Cited

U.S. PATENT DOCUMENTS 5,398,279 A 3/1995 Frain
7,027,569 B2 4/2006 Price
(Continued)

FOREIGN PATENT DOCUMENTS

CN 1694476 A 11/2005
CN 101223765 A 7/2008
(Continued)

*Primary Examiner* — Binh Kien Tieu
(74) *Attorney, Agent, or Firm* — Perkins Coie LLP; Michael A. Glenn

(57) ABSTRACT

The invention provides an interrogator for obtaining information associated with a caller identification, such as a telephone number, transmitted within an incoming telephone call including: a receiving device configured to receive the incoming telephone call and to extract the caller identification from the incoming telephone call; an interrogating device configured to receive the extracted caller identification from the receiving device and to interrogate information associated with the caller identification from an external data base, which is configured to operate independently from the user voice communication device for which the incoming telephone call is intended for; and a forwarding device configured to receive and to forward the interrogated information.

9 Claims, 5 Drawing Sheets

Related U.S. Application Data continuation of application No. PCT/EP2015/071761, filed on Sep. 22, 2015.

(51) Int. Cl.
*H04M 3/42* (2006.01)
*H04M 1/2745* (2006.01)

(52) U.S. Cl.
CPC .. *H04M 2201/38* (2013.01); *H04M 2203/555* (2013.01); *H04M 2203/558* (2013.01)

(58) Field of Classification Search
USPC ........... 379/88.19, 88.2, 88.21, 93.17, 93.23, 379/142.01, 142.02, 142.04, 142.06, 379/142.17, 201.01, 201.02, 207.13, 379/207.15, 210.02, 211.02, 210.03
See application file for complete search history.

(56) References Cited

U.S. PATENT DOCUMENTS

| | | | |
|---|---|---|---|
| 8,917,843 B2 | 12/2014 | Sharpe | |
| 9,509,838 B2* | 11/2016 | Leeds | H04M 1/57 |
| 9,516,163 B2 | 12/2016 | Hickey et al. | |
| 2004/0171372 A1 | 9/2004 | Tokudome | |
| 2005/0232247 A1* | 10/2005 | Whitley | H04L 12/2803 370/352 |
| 2009/0005023 A1 | 1/2009 | Toorn | |
| 2010/0173613 A1 | 7/2010 | Park | |
| 2011/0116612 A1 | 5/2011 | Ho | |
| 2013/0007150 A1* | 1/2013 | Hertz | H04L 51/32 709/206 |
| 2014/0105373 A1* | 4/2014 | Sharpe | H04M 3/4365 379/142.05 |
| 2015/0215449 A1 | 7/2015 | Hirata et al. | |
| 2017/0118331 A1* | 4/2017 | Gruchala | H04M 3/42059 |

FOREIGN PATENT DOCUMENTS

| | | |
|---|---|---|
| JP | 2001189948 A | 7/2001 |
| JP | 2004153779 A | 5/2004 |
| JP | 2005175708 A | 6/2005 |
| JP | 2012100080 A | 5/2012 |
| KR | 20100081022 A | 7/2010 |
| WO | 2007109342 A2 | 9/2007 |

* cited by examiner

AUTOMATIC CALLER IDENTIFICATION TRANSLATION

CROSS-REFERENCE TO RELATED APPLICATIONS

This application is a divisional of U.S. patent application Ser. No. 15/467,736 filed Mar. 23, 2017, which is a continuation of copending International Application No. PCT/EP2015/071761, filed Sep. 22, 2015, which is incorporated herein by reference in its entirety, and additionally claims priority from European Application No. EP 14 186 402.5, filed Sep. 25, 2014, which is incorporated herein by reference in its entirety.

BACKGROUND OF THE INVENTION

The invention relates to the technical field of voice communication systems. In particular the invention relates to voice communication systems comprising user voice communication devices, such as telephones, having a display device.

Such user voice communication devices may be configured in such way that, in case of the user voice communication device receives an incoming telephone call, a caller identification, such as a telephone number, indicating from which remote user voice communication device the incoming telephone call originates, is displayed or presented at the display device.

Modern user voice communication devices, such as smart phones, are often equipped with a memory for storing contact information. Such a memory often is called contact list. Such modern user voice communication devices may be configured in such way that, in case of an incoming telephone call the caller identification is translated into the name of the owner of the remote user voice communication device by using information stored in the contact list.

Up to now arriving calls with number transmission are matched in the user device/telephone by comparing the incoming caller's number with content of a stored contact data base. This eases recognition of who is calling to the recipient of the call and thus he can more easily react accordingly without having to remember many: identifications (caller IDs) or just to pick-up the phone like with plain old telephone service (POTS) without a number display.

If someone calls whose number is not yet in the internal contact list of the recipient's user voice communication device then the recipient does not know who the caller is or was while the caller in most cases knows who he is approaching by initiating the call. On the other hand, if somebody calls with new contact information, the old contact info may be displayed. Without active updating of the change in contact information of the caller by the user/recipient this information easily becomes outdated.

Such imbalance in knowledge about who is calling is often disturbing, molesting or might cause unwanted surprises. In order to avoid such situations, people tend not to answer the call straight away or not to call back. This understandable strategy or behavior is delaying or hindering first contact initiation in many instances.

SUMMARY

According to an embodiment, an interrogator for obtaining information associated with a caller identification, such as a telephone number, transmitted within an incoming telephone call may have: a receiving device configured to receive the incoming telephone call and to extract the caller identification from the incoming telephone call; an interrogating device configured to receive the extracted caller identification from the receiving device and to interrogate information associated with the caller identification from an external data base, which is configured to operate independently from the user voice communication device for which the incoming telephone call is intended for; and a forwarding device configured to receive and to forward the interrogated information; herein the interrogator has a statistics module configured to gather statistics regarding telephone calls with the same caller identification and to forward the statistics.

According to another embodiment, a user voice communication device, such as a telephone, may have: a microphone for recording of voice signals; loudspeaker for reproduction of voice signals; an input device configured for controlling operations of the user voice communication device by user actions; a display device configured to present information in visual form; and an interrogator for obtaining information associated with a caller identification, such as a telephone number, transmitted within an incoming telephone call, the interrogator having: a receiving device configured to receive the incoming telephone call and to extract the caller identification from the incoming telephone call, an interrogating device configured to receive the extracted caller identification from the receiving device and to interrogate information associated with the caller identification from an external data base, which is configured to operate independently from the user voice communication device for which the incoming telephone call is intended for, and a for warding device configured to receive and to forward the interrogated information; wherein the display device is configured to present the interrogated information forwarded by the interrogator when receiving the incoming telephone call.

According to another embodiment, a user voice communication device, such as a telephone, may have: a microphone for recording of voice signals; a loudspeaker for reproduction of voice signals; an input device configured for controlling operations of the user voice communication device by user actions; a display device configured to present information in visual form; and a receiving unit configured to receive the interrogated information from an interrogator for obtaining information associated with a caller identification, such as a telephone number, transmitted within an incoming telephone call, and to forward the interrogated information; wherein the interrogator has: a receiving device configured to receive the incoming telephone call and to extract the caller identification from the incoming telephone call, an interrogating device configured to receive the extracted caller identification from the receiving device and to interrogate information associated with the caller identification from an external data base, which is configured to operate independently from the user voice communication device for which the incoming telephone call is intended for, and a forwarding device configured to receive and to forward the interrogated information; wherein the forwarding device is configured to forward the associated information to a remote user voice communication device for which the telephone call is intended for over at least one third communication channel, in particular over at least one third packet based communication channel, connecting the interrogator and the remote user voice communication device; wherein the display device is configured to present the interrogated information forwarded by the receiving unit when receiving the incoming telephone call;

wherein the user voice communication device has a contact list, wherein the user voice communication device is configured in such way that the interrogated information is used to update the contact list automatically or on a respective user action at the input device.

Another embodiment may have a voice communication network having an inventive interrogator and an external data base, wherein the interrogator and the external data base are connected in such way that the interrogator may interrogate information associated with the caller identification from the external data base when receiving the incoming call.

In one aspect the invention provides an interrogator for obtaining information associated with a caller identification, such as a telephone number, transmitted within an incoming telephone call comprising:

a receiving device configured to receive the incoming telephone call and to extract the caller identification from the incoming telephone call;

an interrogating device configured to receive the extracted caller identification from the receiving device and to interrogate information associated with the caller identification from an external data base, which is configured to operate independently from the user voice communication device for which the incoming telephone call is intended for; and a forwarding device configured to receive and to forward the interrogated information.

A caller identification is a, in particular alpha numeric, code, transmitted within a telephone call, which is used to identify the user voice communication device from which the telephone call originates. The caller identification may be in particular a telephone number or a particular IP-number of a computer using VoIP. A user voice communication device is any device comprising at least a microphone and a loudspeaker, which is configured to initiate and to receive a telephone call. User voice communication devices are in particular landline telephones, mobile telephones and computers having a microphone and a loudspeaker and being configured to initiate and to receive telephone calls. User voice communication devices may use analog telecommunication channels, digital telecommunication channels, such as IDSN, or packet based telecommunication channel, such as VoIP.

The term interrogator as used herein refers to a device capable of formulating a query or a data base interrogation in order to get specific information related to the query. Specifically the query contains the caller identification which might be added by further parameter to specify the kind and amount of data to be requested by the interrogator. The forwarding device is capable of receiving the answer of the external data base to the interrogation, which is specifically information associated with the caller identification and to forward it in particular to an output device of the user voice communication device for which the incoming telephone call is intended.

The interrogator according to the invention translates the caller identification using information associated with the caller identification, which is stored in an external data base, which is operated independently from a user voice communication device for which the incoming telephone call is intended. Therefore, it's possible to display information related to the caller identification which is not stored at the user voice communication device.

The term external data base usually is located outside of the user voice communication device for which the incoming telephone call is intended. It can be a company data base or a data base in the home network or an associated laptop.

The invention provides a mechanism for information proliferation associated with a specific telephone number transmitted during a telephone call. The invention enables an added value service to the caller and the recipient of the telephone call by checking and matching the caller ID/telephone number with more informative data registered in the data base which associates the caller ID/telephone number which is uniquely linked with caller specific information.

However, the associated information will not be transferred directly from the user voice communication device of the caller to the user voice communication device of the recipient, so that security problems such as propagation of viruses are avoided.

The interrogator and its associated databases can be configured such, that privacy obligations are met. Access rules may be established for individual users or groups of individual users, which define which information contained in the external database is provided upon an interrogation. If, for example, the recipient of the call is working for the same company as the caller, more information may be provided compared to a case where the recipient is working for another company than the caller.

For instance the described cross checking can be performed by an application software (app) installed on the user's smart phone which establishes or has already an active internet connection when the telephone call arrives. The app is accessing the data base where information about the caller ID is available e.g. this can be telephone company's online telephone book like white or yellow pages, or any other data base which allows association of the caller's ID and additional information. This includes also data bases like those used by Skype or other Voice over Internet Protocol services (VoIP services).

If such information is available, the recipient of the call will get the appropriate information associated with the caller ID to be displayed on his user voice communication device.

The mechanism is in the opposite direction similar to the Dynamic Name Servers (DNS) used on the internet in order to translate web address names like www.test.com into an IP number to know the address of the server who holds the content for the web link of interest.

Furthermore, the invention allows incorporating the option that users can have full content control what is associated with their caller ID. Such authorized data bases could be run by a government agency, a telephone operator or someone else to handle such information in a trustful manner.

When using internet based VoIP telephony using Session Initiation Protocol (SIP) the caller's telephone number/ID can be associated with a name or other information stored at the SIP contact register base.

The invention provides balanced identity information between caller and recipient of a telephone call.

Currently the recipient just gets the caller's ID displayed on his phone when the caller's is not in the recipient's contact list yet. The structure of the caller's ID might provide a hint to the location or organization of the caller if the recipient is familiar with such number structures like country code, city code etc. If that is not the case the recipient has very little information about the caller's identity. The numerical ID is just good enough for calling back in order to find out who is answering the phone.

Compared to that the invention provides following advantages:

1. By providing more and better suited information about the caller by associating his caller ID with information obtained from a database, such as a trusted server, the recipient of the call gets more information about the caller before answering the call or calling back.
2. By having this information the recipient can easier and faster make decisions if and when to answer the call or when to call back, situation appropriate priority handling when and whom to answer is facilitated.
3. Professionals and private users can associate specific information with the ID, similar to entries in a telephone book.
4. The data base can be operated and updated by one or several hosts or a specifically authorized legal entity.
5. People can easier check who was calling in order to make priorities when calling back.
6. The service can be provided automatically by a telecommunications service provider (TSP) or even mobile network operator (MNO) by providing the additional information over e.g. the SMS data channel, which can even be operated in parallel with Global System for Mobile Communications (GSM) whereas other data services (packet switched service) can usually not co-operate with speech services (circuit switched). For all IP based mobile telephony systems like LTE implementations of such features are very easy.

According to an embodiment of the invention the interrogator is configured to interrogate and forward the associated information containing alpha numeric messages and/or image messages.

Associated information may include name, gender, age, company, slogan, location etc. of the owner of the user voice communication device from which the telephone call originates. Associated information may also include an open-ID field. The field may indicate if the caller is willing to provide information about his own identity or if information about his identity is available at the external data base.

If such information being associated with the caller's ID is available it may be forwarded to the user voice communication device. The forwarded associated information may then be displayed at the display of the recipient's user voice communication device so that the recipient may identify the caller. If the recipients user voice communication device is capable of displaying images it may also be useful that the associated information includes image messages related to the caller identification. Modern day smart phones or computers usually provide this option.

If such associated information is not yet existing, for instance if someone gets a call from a phone which never was used to call the recipient before, the interrogator will just keep the caller's number to inform the target/recipient about the call and where it came from, so the intended recipient of the call can opt to call back.

According to an embodiment of the invention the receiving device is configured to receive the incoming telephone call over at least one first telecommunication channel, in particular at least one first packet based telecommunication channel, connecting the interrogator and user voice communication device, from which the incoming telephone call comes from. The first telecommunication channel may comprise analog telecommunication channels, digital telecommunication channels, such as IDSN, or packet based telecommunication channel, such as VoIP. By these features the physical location of the interrogator is independent from the physical location of the user voice communication device, from which the incoming telephone call comes from.

According to an embodiment of the invention the interrogating device is configured to interrogate the associated information over at least one second telecommunication channel, in particular over at least one second packet based telecommunication channel, connecting the interrogator and the external data base, and wherein the forwarding device is configured to receive the associated information over the at least one second telecommunication channel, in particular over at least one second packet based telecommunication channel. The second telecommunication channel may comprise analog telecommunication channels, digital telecommunication channels, such as IDSN, or packet based telecommunication channel, such as VoIP. By these features the physical location of the interrogator is independent from the physical location of the external database.

According to an embodiment of the invention the interrogator comprises a statistics module configured to gather statistics regarding previous telephone calls with the same caller identification and to forward the statistics. By these features additional information may be presented to the recipient of the incoming telephone call.

According to an embodiment of the invention the forwarding device is configured to forward the associated information to a remote user voice communication device for which the telephone call is intended for over at least one third communication channel, in particular over at least one third packet based communication channel. The third telecommunication channel may comprise analog telecommunication channels, digital telecommunication channels, such as IDSN, or packet based telecommunication channel, such as VoIP.

According to an embodiment of the invention the forwarding device is configured to forward the statistics to the remote user voice communication device over the at least one third communication channel, in particular over the at least one third packet based communication channel.

According to an embodiment of the invention the forwarding device is configured to forward the incoming telephone call to the remote user voice communication device over the at least one third communication channel, in particular over the at least one third packet based communication channel.

By these features the physical location of the interrogator is independent from the physical location of the user voice communication device for which the telephone call is intended for.

According to an embodiment of the invention the receiving device, the interrogating device and/or the forwarding device is a virtual device such as a software module. Virtual devices are devices which are not represented by hardware such as an electronic circuit. If one or more of said devices are virtual devices, the hardware costs may be minimized. However, it is also possible to realize said devices as hardware. The virtual devices may be in principle located anywhere in the communication network.

In a further aspect the invention provides a user voice communication device, such as a telephone, comprising:
a microphone for recording of voice signals;
a loudspeaker for reproduction of voice signals;
an input device configured for controlling operations of the user voice communication device by user actions;
a display device configured to present information in visual form; and
an interrogator according to one of claims 1 to 5;
wherein the display device is configured to present the interrogated information forwarded by the interrogator when receiving the incoming telephone call.

In this embodiment of the invention the interrogator is embedded into the user voice communication device for which the incoming telephone call is intended for.

In another aspect the invention provides a user voice communication device, such as a telephone, comprising:
a microphone for recording of voice signals;
a loudspeaker for reproduction of voice signals;
an input device configured for controlling operations of the user voice communication device by user actions;
a display device configured to present information in visual form; and
a receiving unit configured to receive the interrogated information from an interrogator according to claim 6 or 7 and to forward the interrogated information;
wherein the display device is configured to present the interrogated information forwarded by the receiving unit when receiving the incoming telephone call.

In this embodiment of the invention the interrogator as described above is employed independently from the user voice communication device for which the incoming telephone call is intended for.

According to an embodiment of the invention the user voice communication device comprises a contact list, wherein the user voice communication device is configured in such way that the interrogated information is used to update the contact list automatically or on a respective user action at the input device.

According to an embodiment of the invention the user voice communication device is configured in such way that it is selectable by a respective user action at the input device whether the interrogated information, information from the contact list related to the caller identification or a mixture of both is presented at the display device when receiving the incoming telephone call.

According to an embodiment of the invention the user voice communication device is configured in such way that, if information from the contact list related to the caller identification is available, the available information from the contact list is presented automatically when receiving the incoming telephone call in case that the interrogated information is not forwarded.

According to an embodiment of the invention statistics regarding previous telephone calls with the same caller identification forwarded by the interrogator are presented at the display device automatically when receiving the incoming telephone call and/or upon a respective user action at the input device.

In a further aspect the invention relates to a voice communication network comprising an interrogator and an external data base, wherein the interrogator and the external data base are connected in such way that the interrogator may interrogate information associated with the caller identification from the external data base when receiving the incoming call.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
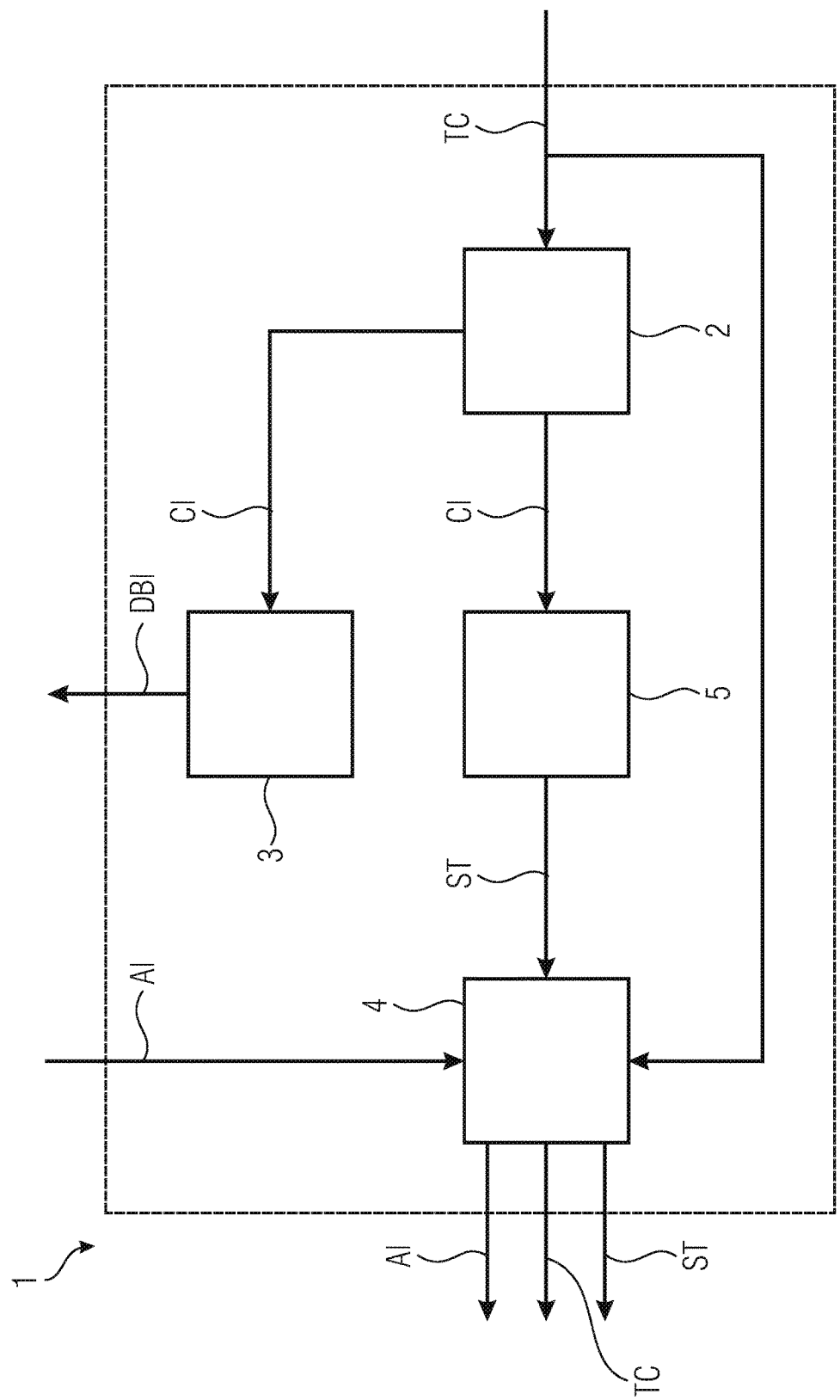
FIG. 1 illustrates an embodiment of an interrogator according to the invention in a schematic view.

FIG. 1 illustrates an embodiment of an interrogator 1 according to the invention in a schematic view. The interrogator 1 for obtaining information AI associated with a caller identification CI, such as a telephone number CI, transmitted within an incoming telephone call TC comprises:
a receiving device 2 configured to receive the incoming telephone call TC and to extract the caller identification CI from the incoming telephone call TC;
an interrogating device 3 configured to receive the extracted caller identification CI from the receiving device 2 and to interrogate information AI associated with the caller identification CI from an external data base 13, see FIGS. 4 and 5, which is configured to operate independently from the user voice communication device 6, 6', see FIGS. 2 to 5, for which the incoming telephone call TC is intended for; and
a forwarding device 4 configured to receive and to forward the interrogated information AI.

Figure 3:
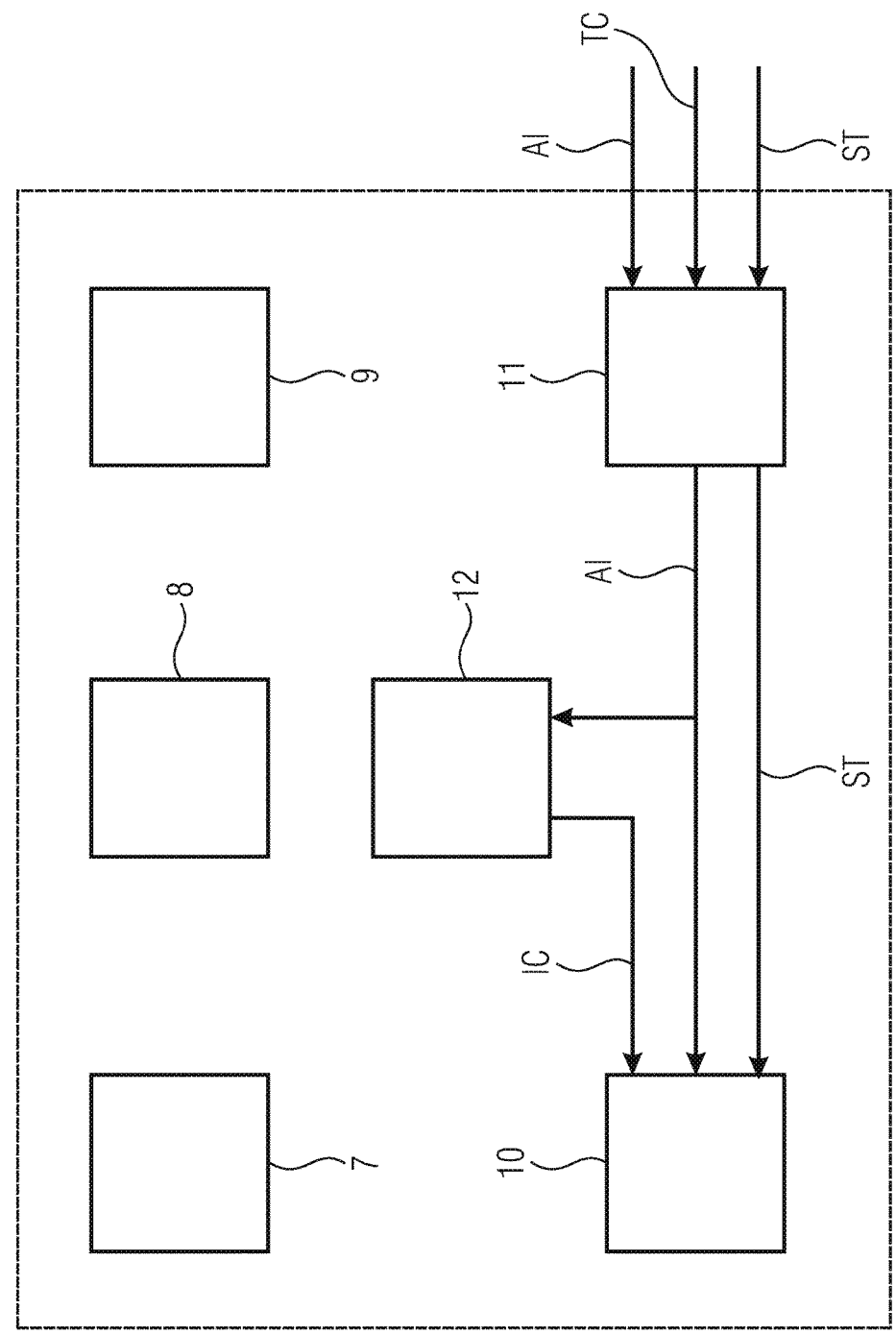
FIG. 3 illustrates a second embodiment of the user voice communication device according to the invention in a schematic view.
Figure 4:
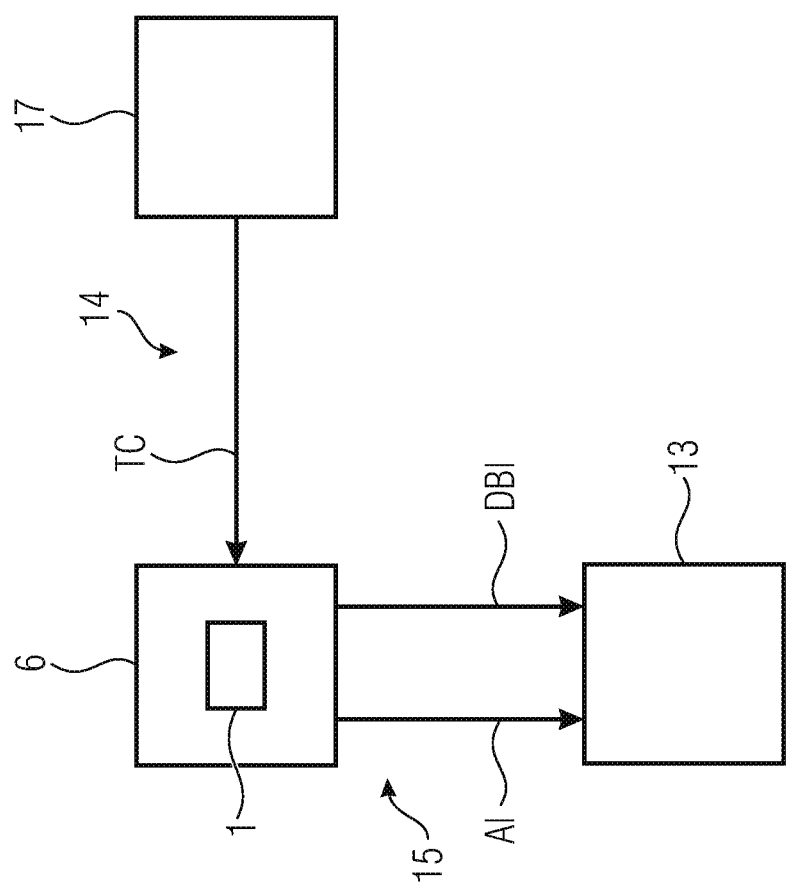
FIG. 4 illustrates a first example for the integration of an interrogator according to the invention into a voice telecommunication system in a schematic view.
Figure 5:
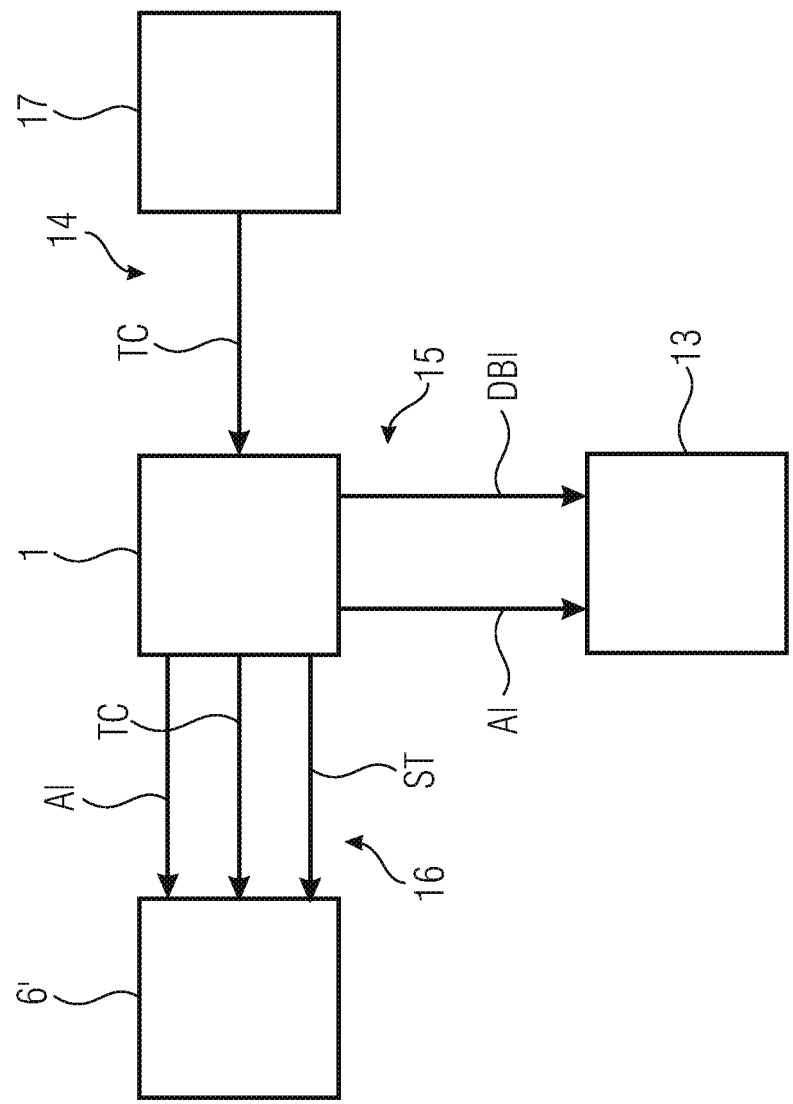
FIG. 5 illustrates a second example for the integration of an interrogator according to the invention into a voice telecommunication system in a schematic view.

A caller identification CI is a, in particular alpha numeric, code, transmitted within a telephone call TC, which is used to identify the user voice communication device 17, see FIGS. 4 and 5, from which the telephone call TC originates. The caller identification CI may in particular be a telephone number Cl. A user voice communication device 6, 6', 17 is any device comprising at least a microphone 7, see FIGS. 2 and 3 and a loudspeaker, see FIGS. 2 and 3, which is configured to initiate and to receive a telephone call TC. User voice communication devices 6, 6', 17 are in particular landline telephones, mobile telephones and computers having a microphone 7 and a loudspeaker 8th and being configured to initiate and to receive telephone calls TC. User voice communication devices 6, 6', 17 may use analog telecommunication channels, digital telecommunication channels, such as IDSN, or packet based telecommunication channel, such as VoIP.

The term interrogator 4 as used herein refers to a device capable of formulating a query or a data base interrogation DBI, in order to get specific information AI related to the query DBI. Specifically the query DBI contains the caller identification CI. The forwarding device 4 is capable of receiving the answer AI of the data base interrogation DBI, which is specifically information AI associated with the caller identification CI.

The interrogator 1 according to the invention translates the caller identification CI using information AI associated with the caller identification CI, which is stored in a data base 13, which is operated independently from a user voice communication device 6, 6' for which the incoming telephone call TC is intended. Therefore, it's possible to display information AI related to the caller identification CI which is not stored at the user voice communication device 6, 6'.

The invention provides a mechanism for information proliferation associated with a specific telephone number CI transmitted during a telephone call TC. The invention enables an added value service to the caller and the recipient of the telephone call TC by checking and matching the caller ID/telephone number CI with more informative data AI registered in the data base 13 which associates the caller ID/telephone number CI which is uniquely linked with caller specific information AI.

However, the associated information AI will not be transferred directly from the user voice communication device 17 of the caller to the user voice communication device 6, 6' of the recipient, so that security problems, such as propagation of viruses, are avoided.

For instance the described cross checking can be performed by an application software 1 (*app*) installed on the user's smart phone 6, 6' which establishes or has already an active internet connection when the telephone call TC arrives. The app 1 is accessing the data base 13 where information AI about the caller identification CI is available e.g. this can be telephone company's online telephone book like white or yellow pages, or any other data base which allows association of the caller's identification CI and additional information. This includes also data bases like those used by Skype or other Voice over Internet Protocol services (VoIP services).

If such information AI is available, the recipient of the call TC will get the appropriate information AI associated with the caller identification CI to be displayed on his user voice communication device 6, 6'.

The mechanism is in the opposite direction similar to the Dynamic Name Servers (DNS) used on the internet in order to translate web address names like www.test.com into an IP number to know the address of the server who holds the content for the web link of interest.

Furthermore, the invention allows incorporating the option that users can have full content control what is associated with their caller identification Cl. Such authorized data bases 13 could be run by a government agency, a telephone operator or someone else to handle such information in a trustful manner.

When using internet based VoIP telephony using Session Initiation Protocol (SIP) the caller's telephone number/ID can be associated with a name or other information stored at the SIP contact register base.

The invention provides balanced identity information between caller and recipient of a telephone call TC.

Currently the recipient just gets the caller's identification CI displayed on his phone when the caller's is not in the recipient's contact list yet. The structure of the caller's identification CI might provide a hint to the location or organization of the caller if the recipient is familiar with such number structures like country code, city code etc. If that is not the case the recipient has very little information about the caller's identity. The numerical identification CI is just good enough for calling back in order to find out who is answering the phone.

Compared to that the invention provides following advantages:
1. By providing more and better suited information AI about the caller by associating his caller identification CI with information AI obtained from a database 13, such as a trusted server 13, the recipient of the call gets more information AI about the caller before answering the call TC or calling back.
2. By having this information AI the recipient can easier and faster make decisions if and when to answer the call TC or when to call back, situation appropriated priority handling when and whom to answer is facilitated.
3. Professionals and private users can associate specific information AI with the caller identification CI, similar to entries in a telephone book.
4. The data base 13 can be operated and updated by one or several hosts or a specifically authorized legal entity.
5. People can easier check who was calling in order to make priorities when calling back.
6. The service can be provided automatically by a telecommunications service provider (TSP) or even mobile network operator (MNO) by providing the additional information AI over e.g. the SMS data channel, which can even be operated in parallel with Global System for Mobile Communications (GSM) whereas other data services (packet switched service) can usually not co-operate with speech services (circuit switched). For all IP based mobile telephony systems like LTE implementations of such features are very easy.

According to an embodiment of the invention the interrogator 1 is configured to interrogate and forward the associated information AI containing alpha numeric messages and/or image messages.

Associated information AI may include name, gender, age, company, slogan, location etc. of the owner of the user voice communication device from which the telephone call originates. Associated information AI may also include an open-ID field. The field may indicate if the caller is willing to provide information about his own identity or if information about his identity is available at the external data base.

If such information AI being associated with the caller's identification CI is available it may be forwarded to the user voice communication device 6, 6'. The forwarded associated information AI may then be displayed at the display device 10, see FIGS. 2 and 3, of the recipient's user voice communication device 6, 6' so that the recipient may identify the caller. If the recipients user voice communication device 6, 6' is capable of displaying images it may also be useful that the associated information AI includes image messages related to the caller identification CI. Modern day smart phones or computers usually provide this option.

If such associated information AI is not yet existing, for instance if someone gets a call from a phone 17 which never was used to call the recipient before, the interrogator 1 will just keep the caller's number CI to inform the target/recipient about the call TC and where it came from, so the intended recipient of the call TC can opt to call back.

According to an embodiment of the invention the receiving device who is configured to receive the incoming telephone call TC over at least one first telecommunication channel 14, see FIGS. 4 and 5, in particular at least one first packet based telecommunication channel 14, connecting the interrogator 1 and user voice communication device 17, from which the incoming telephone call TC comes from. The first telecommunication channel 14 may comprise analog telecommunication channels, digital telecommunication channels, such as IDSN, or packet based telecommunication channel 14, such as VoIP. By these features the physical location of the interrogator 1 is independent from the physical location of the user voice communication device 17, from which the incoming telephone call comes from.

According to an embodiment of the invention the interrogating device 3 is configured to interrogate the associated information AI over at least one second telecommunication channel 15, see FIGS. 4 and 5, in particular over at least one first packet based telecommunication channel 15, connecting the interrogator 1 and the external data base 13, and wherein the forwarding device for is configured to receive the associated information AI over the at least one second telecommunication channel 15, in particular over at least one second packet based telecommunication channel 15. The second telecommunication channel 15 may comprise analog telecommunication channels, digital telecommunication channels, such as IDSN, or packet based telecommunication channel, such as VoIP. By these features the physical location of the interrogator 1 is independent from the physical location of the external database 13.

According to an embodiment of the invention the interrogator 1 comprises a statistics module 5 configured to gather statistics ST regarding previous telephone calls with the same caller identification CI and to forward the statistics ST. By these features additional information ST may be presented to the recipient of the incoming telephone call TC.

According to an embodiment of the invention the forwarding device for is configured to forward the associated information AI to a remote user voice communication device 6' for which the telephone call TC is intended for over at least one third communication channel 16, see FIG. 5, in particular over at least one third packet based communication channel 16. The third telecommunication channel 16 may comprise analog telecommunication channels, digital telecommunication channels, such as IDSN, or packet based telecommunication channel, such as VoIP.

According to an embodiment of the invention the forwarding device for is configured to forward the statistics ST to the remote user voice communication device 6' over the at least one third communication channel 16, in particular over the at least one third packet based communication channel 16.

According to an embodiment of the invention the forwarding device for is configured to forward the incoming telephone call TC to the remote user voice communication device 6' over the at least one third communication channel 16, in particular over the at least one third packet based communication channel 16.

By these features the physical location of the interrogator 1 is independent from the physical location of the user voice communication device 6' for which the telephone call TC is intended for.

According to an embodiment of the invention the receiving device 2, the interrogating device 3 and/or the forwarding device 4 is a virtual device 2, 3, 4 such as a software module 2, 3, 4. Virtual devices are devices which are not represented by hardware such as an electronic circuit. If one or more of said devices 2, 3, 4 are virtual devices 2, 3, 4 the hardware costs may be minimized. However, it is also possible to realize said devices 2, 3, 4 as hardware. The virtual devices 2, 3, 4 may be in principle located anywhere in the communication network.

Figure 2:
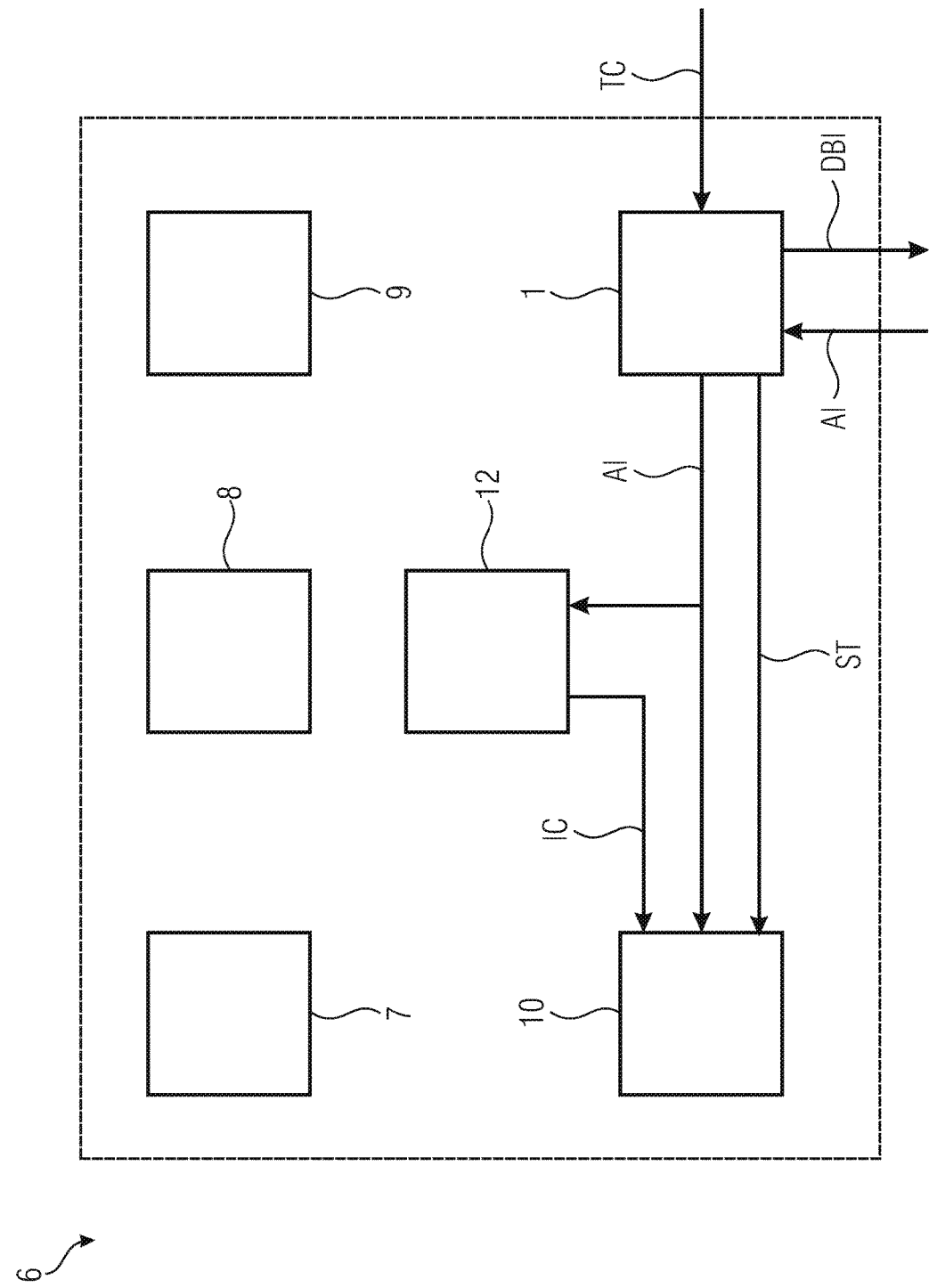
FIG. 2 illustrates a first embodiment of a user voice communication device according to the invention in a schematic view.

FIG. 2 illustrates a first embodiment of a user voice communication device 6 according to the invention in a schematic view. The user voice communication device 6, such as a telephone, comprises:

a microphone 7 for recording of voice signals;
a loudspeaker 8 for reproduction of voice signals;
an input device 9 configured for controlling operations of the user voice communication device by user actions;
a display device 10 configured to present information in visual form; and an interrogator 1 according to one of claims 1 to 5;
wherein the display device 10 is configured to present the interrogated information AI forwarded by the interrogator 1 when receiving the incoming telephone call TC.

In this embodiment of the invention the interrogator 1 is embedded into the user voice communication device 6 for which the incoming telephone call TC is intended for.

FIG. 3 illustrates a second embodiment of the user voice communication device according to the invention in a schematic view. The user voice communication device 6', such as a telephone, comprises:

a microphone 7 for recording of voice signals;
a loudspeaker 8 for reproduction of voice signals;
an input device 9 configured for controlling operations of the user voice communication device by user actions;
a display device 10 configured to present information in visual form; and
a receiving unit 11 configured to receive the interrogated information AI from an interrogator 1 according to claim 6 or 7 and to forward the interrogated information AI;
wherein the display device 10 is configured to present the interrogated information AI forwarded by the receiving unit 11 when receiving the incoming telephone call TC.

In this embodiment of the invention the interrogator 1 as described above is employed independently from the user voice communication device 6' for which the incoming telephone call TC is intended for.

According to an embodiment of the invention the user voice communication device 6, 6' comprises a contact list 12, wherein the user voice communication device 6, 6' is configured in such way that the interrogated information AI is used to update the contact list 12 automatically or on a respective user action at the input device 9.

According to an embodiment of the invention the user voice communication device 6, 6' is configured in such way that it is selectable by a respective user action at the input device 9 whether the interrogated information AI, information IC from the contact list 12 related to the caller identification the or a mixture of both is presented at the display device 10 when receiving the incoming telephone call TC.

According to an embodiment of the invention the user voice communication device 6, 6' is configured in such way that, if information from the contact list related to the caller identification CI is available, the available information IC from the contact list 12 is presented automatically when receiving the incoming telephone call TC in case that the interrogated information AI is not forwarded.

According to an embodiment of the invention statistics ST regarding previous telephone calls with the same caller identification CI forwarded by the interrogator 1 according to claim 5 are presented at the display device 10 automatically when receiving the incoming telephone call TC and/or upon a respective user action at the input device 9.

FIG. 4 illustrates a first example for the integration of an interrogator according to the invention into a voice telecommunication system in a schematic view. In the embodiment of FIG. 4, the interrogator 1 is embedded in the user voice communication device 6 for which the telephone call TC originating from the user voice communication device 17 is intended. Voice communication device 6 and the voice communication device 17 are connected by the first telecommunication channel 14. The interrogator 1 is configured to send a database interrogation DBI comprising a caller identification CI of the user voice communication device 17 to the data base 13 over a second telecommunication channel 15 which connects the interrogator 1 and the database 13. If the database 13 contains information AI associated with the caller identification CI the information AI will be transmitted over the second telecommunication channel 15 to the user voice communication device 6.

FIG. 5 illustrates a second example for the integration of an interrogator according to the invention into a voice telecommunication system in a schematic view. In the embodiment of FIG. 5, the interrogator 1 is embedded in the voice communication network. User voice communication device 17 from which the telephone call TC is originating and interrogator 1 are connected by the first telecommunication channel 14. The interrogator 1 is configured to send a database interrogation DBI comprising a caller identification CI of the user voice communication device 17 to the data base 13 over a second telecommunication channel 15 which connects the interrogator 1 and the database 13. If the database 13 contains information AI associated with the caller identification CI the information AI will be transmitted over the second telecommunication channel 15 to the interrogator 1. The interrogator 1 forwards the associated information AI, the telephone call TC and optionally statistics ST over the first telecommunication channel 16 2 of the user voice communication device 6 for which the telephone call TC is intended for.

In a further aspect the invention relates to a voice communication network comprising an interrogator 1 according to claim 6 or 7 and an external data base 13, wherein the interrogator 1 and the external data base 13 are connected in such way that the interrogator 1 may interrogate information AI associated with the caller identification CI from the external data 13 base when receiving the incoming call TC.

The principles of the invention may be summarized as follows:

1. According to the invention, an interrogator 1, which may be a the software entity 1, such as an ID Broker 1, which can be located in the user voice communication device 6 or on the network side with the mobile network operator (MNO) is checking the callers identification CI with a data base 13 which provides additional data AI about the caller.
2. The associated information AI may be forwarded from the interrogator 1 to the recipient of the call TC via a packet based communication channel 16.
3. At the recipient's user voice communication device 6, 6' the information AI about the caller's identification CI is displayed for the user to be seen/used.
4. The information AI about the caller can be enriched by the available information AI amount associated with the caller identification CI according the recipient's/user's or caller settings or preferences.
5. If the recipient has information IC about the caller in his contacts list 12, the displayed information can be either the newly provided one AI, or the already available IC one or a mixture of both.
6. Together with the call TC, the caller can also transmit text (e.g. subject of the call) or other data (e.g. picture of a sad dog when apologizing) that gets displayed when the call TC reaches the receiving user voice communication device 6, 6'.
7. The contact list 12 can be updated according to transmitted information AI and the settings of the receiver and/or caller.
8. The user can be subscribed to such ID Broker Service or the ID Broker Service may be offered or provided by the MNO.
9. Caller reputation and statistics ST could be gathered by the interrogator 1.
10. Additional web search and social media search based information or links to them can be provided about the caller and/or by the caller.
11. Recipient of the call can evaluate an open-ID field. The field may indicate if the caller is willing to provide information AI about his own identity or if information about his identity is available at an external data base 13. The recipient list may be categorized and different information may be associated with that categorization. The information and the open-ID field may be set according to that categorization. If there is no content available or the caller is not willing to have information shared about his identity, then the recipient can decide if he is responding with his open-ID field as enabled/disabled depending on the recipient's settings in general or in detail regarding the caller's ID.
12. The former principle can be extended towards the level of information which is shared and this again depending on the status of the communication partner at the other end (caller or recipient).
13. The system may comprise functions about call history. The system may for example evaluate if there was a previous contact or not. The system may also evaluate the number of previous contacts.
14. The system may include categorizations of callers: recipient can put callers into different categories, favorites, . . . . Availability for calls may be set according to this categorization. Communication partners could be categorized e.g. as private friends, business colleagues; public level and information to be shared can also be managed in different categories.
15. System may be extended towards managed group calls. All these principles may be applied to multipoint connections.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user voice communication device comprising:
a microphone for recording of voice signals;
a loudspeaker for reproduction of voice signals;
an input device configured for controlling operations of the user voice communication device by user actions;
a display device configured to present information in visual form; and
a receiving unit configured to receive the interrogated information from an interrogator for acquiring information associated with a caller identification transmitted within an incoming telephone call, and to forward the interrogated information;
wherein the interrogator comprises:
a receiving device configured to receive the incoming telephone call and to extract the caller identification from the incoming telephone call,
an interrogating device configured to receive the extracted caller identification from the receiving device and to interrogate information associated with the
caller identification from an external data base, which is configured to operate independently from the user voice communication device for which the incoming telephone call is intended for, and
a forwarding device configured to receive and to forward the interrogated information;
wherein the forwarding device is configured to forward the associated information to a remote user voice communication device for which the telephone call is intended for over at least one third communication channel, in particular over at least one third packet based communication channel,
connecting the interrogator and the remote user voice communication device;

wherein the display device is configured to present the interrogated information forwarded by the receiving unit when receiving the incoming telephone call;

wherein the user voice communication device is configured in such way that it is selectable by a respective user action at the input device whether the interrogated information, information from the contact list related to the caller identification or a mixture of both is presented at the display device when receiving the incoming telephone call.

2. The user voice communication device according to claim 1, wherein the user voice communication device comprises a contact list, wherein the user voice communication device is configured in such way that the interrogated information is used to update the contact list automatically or on a respective user action at the input device.

3. The user voice communication device according to claim 1, wherein the user voice communication device is configured in such way that, if information from the contact list related to the caller identification is available, the available information from the contact list is presented automatically at the display device when receiving the incoming telephone call in case that the interrogated information is not forwarded.

4. The user voice communication device according to claim 1, wherein the interrogated information forwarded by the interrogator comprises statistics regarding previous telephone calls with the same caller identification, wherein the statistics are presented at the display device automatically when receiving the incoming telephone call and/or upon a respective user action at the input device.

5. A voice communication network comprising an interrogator and an external data base;

wherein the interrogator is configured for acquiring information associated with a caller identification transmitted within an incoming telephone call;

wherein the interrogator comprises a receiving device configured to receive the incoming telephone call and to extract the caller identification from the incoming telephone call, an interrogating device configured to receive the extracted caller identification from the receiving device and to interrogate in-formation associated with the caller identification from an external data base, which is configured to operate independently from the user voice communication device for which the incoming telephone call is intended for, and a forwarding device configured to receive and to forward the interrogated information;

wherein the forwarding device is configured to forward the associated information to a remote user voice communication device for which the tele-phone call is intended for over at least one third communication channel connecting the interrogator and the remote user voice communication device;

wherein the interrogator and the external data base are connected in such way that the interrogator may interrogate information associated with the caller identification from the external data base when receiving the incoming call.

6. A user voice communication device, comprising:
a microphone for recording of voice signals;
a loudspeaker for reproduction of voice signals;
an input device configured for controlling operations of the user voice communication device by user actions;
a display device configured to present information in visual form; and
an interrogator for acquiring information associated with a caller identification, transmitted within an incoming telephone call, the interrogator comprising:
a receiving device configured to receive the incoming telephone call and to extract the caller identification from the incoming telephone call,
an interrogating device configured to receive the extracted caller identification from the receiving device and to interrogate information associated with the caller identification from an external data base, which is configured to operate independently from the user voice communication device for which the incoming telephone call is intended for, and
a forwarding device configured to receive and to forward the interrogated information;
wherein the display device is configured to present the interrogated information forwarded by the interrogator when receiving the incoming telephone call;
wherein the user voice communication device comprises a contact list, wherein the user voice communication device is configured in such way that the interrogated information is used to update the contact list automatically or on a respective user action at the input device.

7. The user voice communication device according to claim 6, wherein the user voice communication device is configured in such way that it is selectable by a respective user action at the input device whether the interrogated information, information from the contact list related to the caller identification or a mixture of both is presented at the display device when receiving the incoming telephone call.

8. The user voice communication device according to claim 6, wherein the user voice communication device is configured in such way that, if information from the contact list related to the caller identification is available, the available information from the contact list is presented automatically at the display device when receiving the incoming telephone call in case that the interrogated information is not forwarded.

9. The user voice communication device according to claim 6, wherein statistics regarding previous telephone calls with the same caller identification forwarded by the interrogator are presented at the display device automatically when receiving the incoming telephone call and/or upon a respective user action at the input device.

* * * * *